United States Patent [19]

Rozelle et al.

[11] Patent Number: 5,097,711
[45] Date of Patent: Mar. 24, 1992

[54] SHROUDED TURBINE BLADE VIBRATION MONITOR AND TARGET THEREFOR

[75] Inventors: Paul F. Rozelle, Fern Park; John F. DeMartini, Lake Mary, both of Fla.

[73] Assignee: Westinghouse Electric Corp., Pittsburgh, Pa.

[21] Appl. No.: 606,800

[22] Filed: Oct. 29, 1990

[51] Int. Cl.$^5$ ............................................. G01H 1/00
[52] U.S. Cl. ........................................................ 73/660
[58] Field of Search ........................ 73/119 R, 660, 661; 324/207.15, 207.16, 207.17, 207.22, 207.25

[56] References Cited

U.S. PATENT DOCUMENTS

| | | | |
|---|---|---|---|
| 3,115,032 | 12/1963 | Northern et al. | 73/660 |
| 4,518,917 | 5/1985 | Oates et al. | 73/660 |
| 4,573,358 | 3/1986 | Luongo. | |
| 4,574,237 | 3/1986 | Hachtel et al. | 324/173 |
| 4,887,468 | 12/1989 | McKendree et al. | |
| 4,896,537 | 1/1990 | Osborne. | |

*Primary Examiner*—Robert Raevis

[57] ABSTRACT

A system for monitoring the vibration of a plurality of shrouded turbine blades carried by a rotor and configured in a row includes a stationary sensor for inducing eddy currents in each shroud segment as each shroud segment passes the sensor. A target is located on each shroud segment for causing variations in the induced eddy currents. The sensor is responsive to the induced eddy currents to produce an output signal containing information corresponding to the time of arrival of the target at the sensor. Another sensor is provided for producing a pulse once per rotor revolution. A blade vibration monitor is responsive to the output signal and the once per rotor revolution pulse to extract blade vibration information therefrom.

3 Claims, 3 Drawing Sheets

SHROUDED TURBINE BLADE VIBRATION MONITOR AND TARGET THEREFOR

BACKGROUND OF THE INVENTION

1. Field of the Invention

The present invention is directed generally to monitoring operating parameters in a steam turbine generator and, more specifically, to the monitoring of turbine blade vibration.

2. Description of the Prior Art

Turbine blades, because of their complex design, can suffer from vibration at frequencies which correspond to natural frequencies of the blades called modes. Each mode is associated with a different type of vibration such as along the rotational axis of the turbine, perpendicular to the rotational axis of the turbine, etc. To prevent excessive vibration of the blade about its normal position, normal design practice dictates that the blades be constructed such that those modes are located between harmonics of the operating frequency of the steam turbine. However, manufacturing tolerances, changes in blade attachment to the rotor, erosion, and changes in the operating frequency of the turbine, among other factors, cause mode frequencies to approach harmonics of the operating frequency. Additionally, damaging nonsynchronous vibration may also occur as a result of buffeting wherein a low steam flow and a high back pressure cause the random excitation of the turbine blades or as a result of turbine rotor torsional stresses.

The approach of the modes to the harmonics of the operating frequency may result in physical damage to the steam turbine. When the amplitude of the vibration exceeds a certain level, objectionable stresses are set up in the blade. If the condition is not detected and remedied, the blade may eventually fracture resulting in an extremely costly forced outage of the machinery.

One prior art technique for detecting blade vibration is to attach strain gages to the turbine blades. Because the strain gauges are attached directly to the blades, it does not matter if the blades are shrouded or unshrouded. Sensor information is communicated to analyzing equipment outside the machine by means of miniature transmitters affixed to the machine's rotating shaft at various locations. Although that technique is very accurate, it suffers from some significant drawbacks. First, the strain gauge has a short life due to erosion such that long term supervisory monitoring is not possible. Second, each blade requires a strain gauge if it is to be monitored. Because only a limited number of transmitters and, therefore, sensors can be accommodated inside the machine, only a few of the blades can be monitored at a time. Third, the complexity of continuously and reliably supplying power to the strain gage and transmitting the signal reliably from the rotating rotor disk to stationary electronics is very difficult.

To obviate those problems, apparatus exist for detecting turbine blade vibration which utilize permanently installed, non-contacting proximity sensors. One such apparatus is disclosed in U.S. Pat. No. 4,573,358 wherein a plurality of sensors spaced about the periphery of the blade row produce pulses whenever a blade passes a sensor. That pulse information is used to detect vibration of operator selected blades. However, the apparatus disclosed in that patent cannot be used on shrouded turbine blades because the shroud located at the periphery of the blades shields the blade tips from the sensors.

Another technique for monitoring blade vibration designed for monitoring the vibration of shrouded turbine blades is disclosed in U.S. Pat. No. 4,896,537. That patent discloses a shrouded turbine blade vibration monitor comprised of a plurality of sensors for sensing the profile of each of the turbine blade rows in a steam turbine by determining the presence of turbine blade shroud segments and turbine blade tenons. A processor is provided for storing an expected profile of the turbine blade row and then comparing the sensed profile to the expected profile to detect motion of the turbine blades due to vibration. Although that technique is effective, it is difficult to reliably sense the profile of the blade row under dynamic conditions. Thus, the need exists for easily and reliably generating, from a shrouded turbine blade row, simple blade pass sensor signals of the type used by unshrouded blade vibration monitors.

SUMMARY OF THE INVENTION

The present invention is directed to a system and method for monitoring the vibration of a plurality of shrouded turbine blades carried by a rotor and configured in a row. The system is comprised of a stationary sensor for inducing eddy currents in each shroud segment as each shroud segment passes the sensor. A target is located on each shroud segment for causing a variation in the induced eddy currents. The sensor is responsive to the induced eddy currents to produce an output signal containing information corresponding to the time of arrival of the target at the sensor. Another sensor is responsive to indicia carried by the rotor for producing a once per revolution pulse. A blade vibration monitor is responsive to the output signal and the once per rotor revolution pulse for extracting vibration information therefrom.

Various embodiments of the present invention illustrate different targets which may be used with the sensor. Those targets include notches, protrusions, conductive foils, conductive material deposited on the turbine shroud, shallow slots formed in the turbine shroud which are filled with a conductive material, and notches cut in the leading and/or trailing edges of the shroud segment.

The present invention is also directed to a method of monitoring the vibration of a plurality of shrouded turbine blades carried by a rotor and configured in a row. The method is comprised of the steps of inducing eddy currents with a sensor in each shroud segment as the shroud segment passes the sensor. Variations are caused in the induced eddy currents by the positioning of targets on each shroud segment. Output signals are produced in response to the induced eddy currents which contain information corresponding to the time of arrival of the target at the sensor. A once per rotor revolution pulse is produced. That pulse together with the output signal is input to a blade vibration monitor which extracts blade vibration information therefrom. The present invention provides a mechanism for easily and reliably generating, from a shrouded turbine blade row, signals representative of time of arrival information. Such signals may be used in blade vibration monitors of the type used with unshrouded turbine blades.

BRIEF DESCRIPTION OF THE DRAWINGS

For the present invention to be clearly understood and readily practiced, preferred embodiments will now be described, by way of example only, with reference to the accompanying figures wherein.

DETAILED DESCRIPTION OF THE PREFERRED EMBODIMENT

Figure 1:
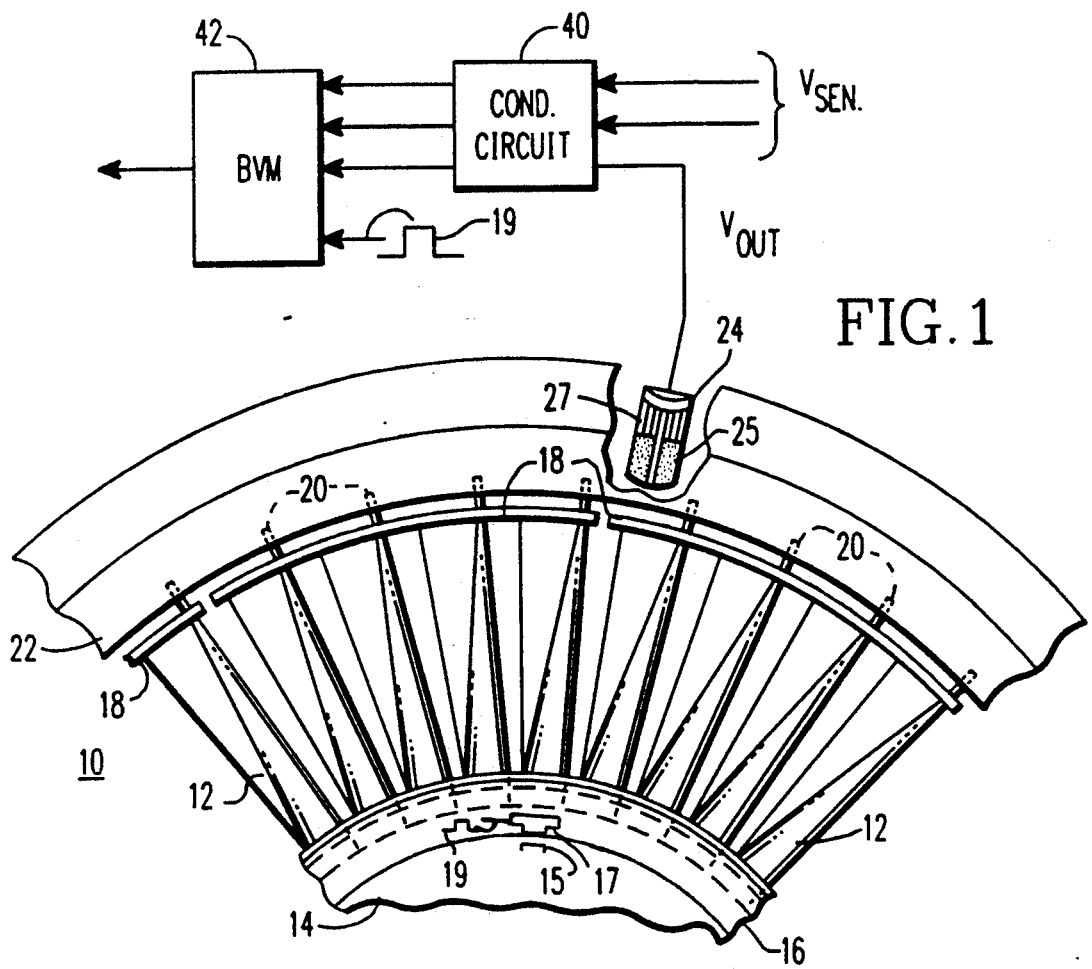
FIG. 1 illustrates a portion of a typical shrouded turbine blade row in conjunction with which the method and apparatus of the present invention may be used.

FIG. 1 illustrates a portion of a shrouded turbine blade row 10 in which the method and apparatus of the present invention to monitor turbine blade vibration can be employed. Like reference numerals are employed among the various figures to designate like elements. The turbine blade row 10 is comprised of a plurality of blades 12, typically one hundred twenty in number, which are connected to a rotor 14 by means of a rotor disk 16. The rotor 14 carries indicia 15 which cooperates with a sensor 17 to produce a pulse 19 once per rotor 14 revolution. The production of such a once per revolution pulse 19 is well known in the art.

The periphery of the blade row 10 is surrounded by a plurality of shroud segments 18, two shroud segments being completely shown and one being partially shown in FIG. 1. As is known, the shroud segments, taken collectively, form the turbine blade shroud. There are many different ways in which the turbine blade shroud may be connected to the turbine blades. In the embodiment illustrated in FIG. 1, each blade 12 has a tenon 20 (shown exaggerated for purposes of illustration) which is an integral part of the blade 12 and serves to fasten the shroud segments 18 to the blades 12. A seal 22 reduces the amount of steam that passes around instead of through the turbine blades 12.

Also illustrated in FIG. 1 is a sensor 24 located within seal 22. The sensor 24 may be one of the commercially available eddy-current type of sensors commonly in use today. As is known, such sensors have an AC excited excitation coil 25 for inducing eddy currents in conductive materials brought into close proximity therewith. The induced eddy currents create a magnetic field which causes the inductance and resistance of the excitation coil 25 to change. A sensing coil 27 is responsive to such changes to produce an output signal Vout.

The sensor 24 operates in conjunction with targets (shown in FIGS. 2 through 5) to produce simple, reliable output signals Vout. The output signals Vout are input to a conditioning circuit 40, which may also include the source of AC excitation (not shown) for the excitation coil 25. The conditioning circuit 40 may also receive signals Vsen from other sensors like sensor 24 (not shown).

The conditioned signals are input to a blade vibration monitor (BVM) 42 of the type disclosed in U.S. Pat. No. 4,573,358, which is hereby incorporated by reference. The BVM 42 also receives the once per rotor revolution pulse 19. Based on that information, the BVM 42 extracts blade vibration information according to techniques disclosed in the aforementioned U.S. Pat. No. 4,573,358.

A single shroud segment 18 and the corresponding portion of the blade row 10 is illustrated in FIGS. 2 through 5. As is shown, the shroud segment 18 has a first portion 26 to which the tenons 20 are connected and a second raised lip portion 28. The sensor 24 is situated in the plane of the blade row 10 outside of the direct flow path of the steam through the turbine blades 12 thus preventing damage to the sensor 24.

Figure 3:
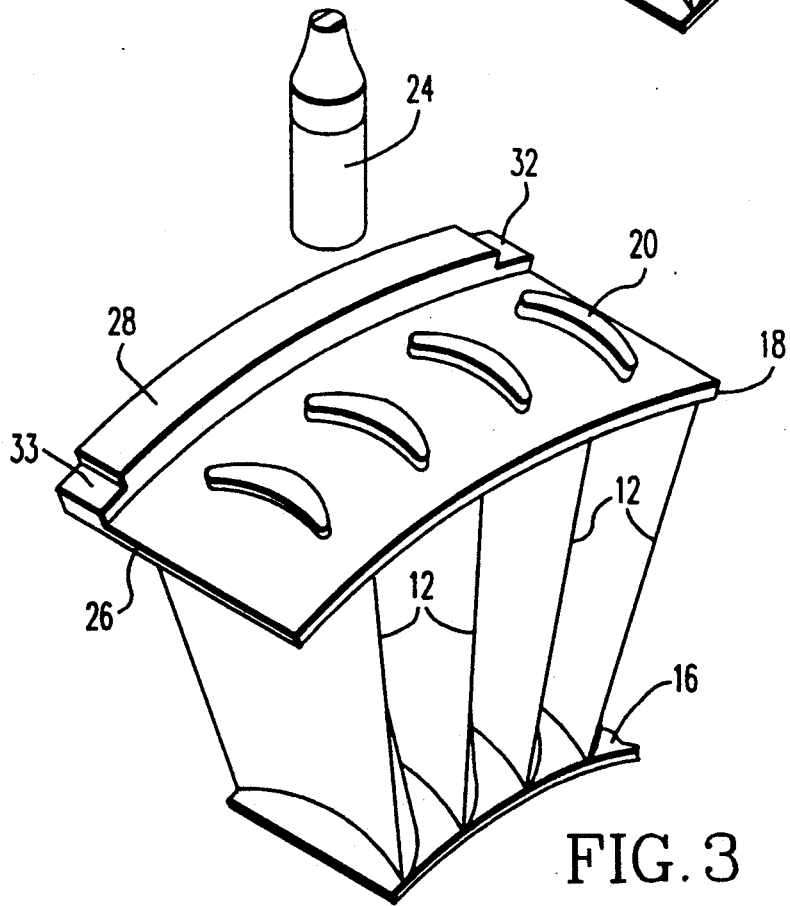
FIGS. 3, 4, and 5 illustrate other embodiments of the targets formed in the shroud segment in accordance with the teachings of the present invention.
Figure 4:
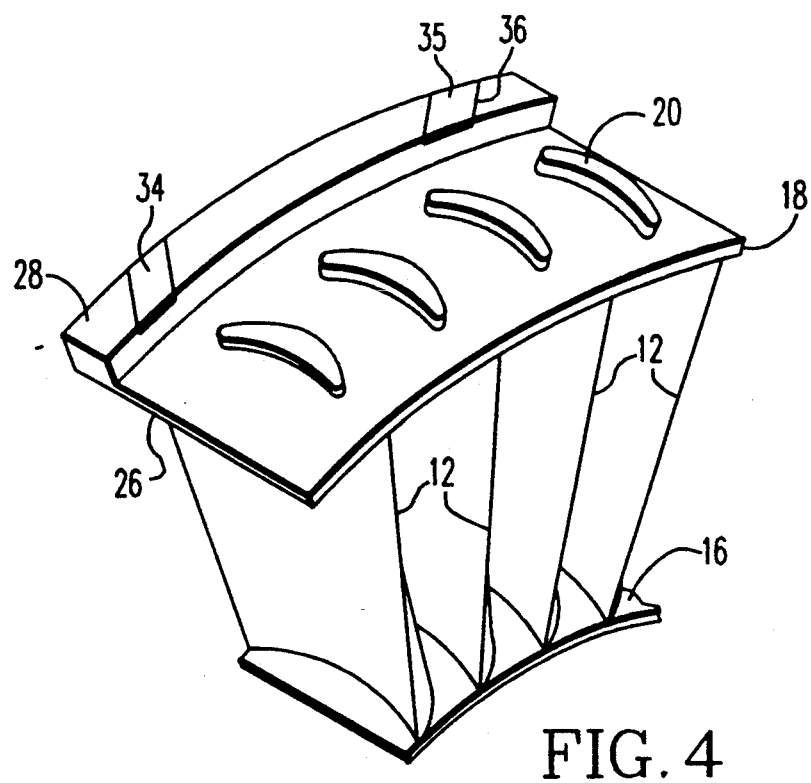

According to the present invention, targets may be provided in several ways: a notch 30 (FIG. 2), a protrusion 31 (FIG. 2), a notch 32 in the leading edge and/or a notch 33 in the trailing edge of shroud segment 18 (FIG. 3), shims, foils or deposited conductive material 34 (FIG. 4), or conductive material 35 positioned within a shallow slot 36 (FIG. 4). By providing targets such as notches 30, 32, 33 or protrusion 31, the output of the eddy current sensor 24 experiences a step change which would not occur in the absence of the notches 30, 32, 33 or protrusion 31. That step change variation in the output signal Vout indicates that the target 30, 31, 32, 33 is at the sensor 24. The conductive targets 34, 35 (FIG. 4) function in a similar manner to provide a step change variation in the output signal Vout indicating that a conductive target 34, 35 is at sensor 24.

By virtue of the targets 30, 31, 32, 33, 34, 35 carried by the shroud 18, output signals Vout are produced which are representative of the time of arrival of the target at the sensor 24. That type of time of arrival signal is analogous to the signals produced in unshrouded turbine blade vibration monitoring systems which have sensors producing time of arrival pulses each time a blade passes. Thus, by generating time of arrival signals from shrouded turbine blades, the present invention enables the capabilities of currently available blade vibration monitors to be extended to monitor the vibration of shrouded turbine blades. When the target is oriented at an angle with respect to the axis of the rotor 14, such as 34, 35 in FIG. 4 the arrival time at sensor 24 is effected by axial as well as tangential deflections of the blades. Hence, the present invention can be used to detect axial as well as tangential blade vibration just as is currently done with unshrouded turbine blades. If more than one target is placed on a shroud segment 18, then multiple measurements may be made on a single group allowing for discrimination among mode shapes.

The simplest way provide targets is to cut notch 30 into the raised portion 28. Although the use of notch 30 has proved successful, such shroud modifications may be undesirable because they may cause stress concentrations and hence sites for crack initiation within the shroud, create leakage paths for steam, and may require special tooling. In addition, such slots are time consuming and costly to cut, and require precision which is difficult to achieve in the field.

Figure 2:
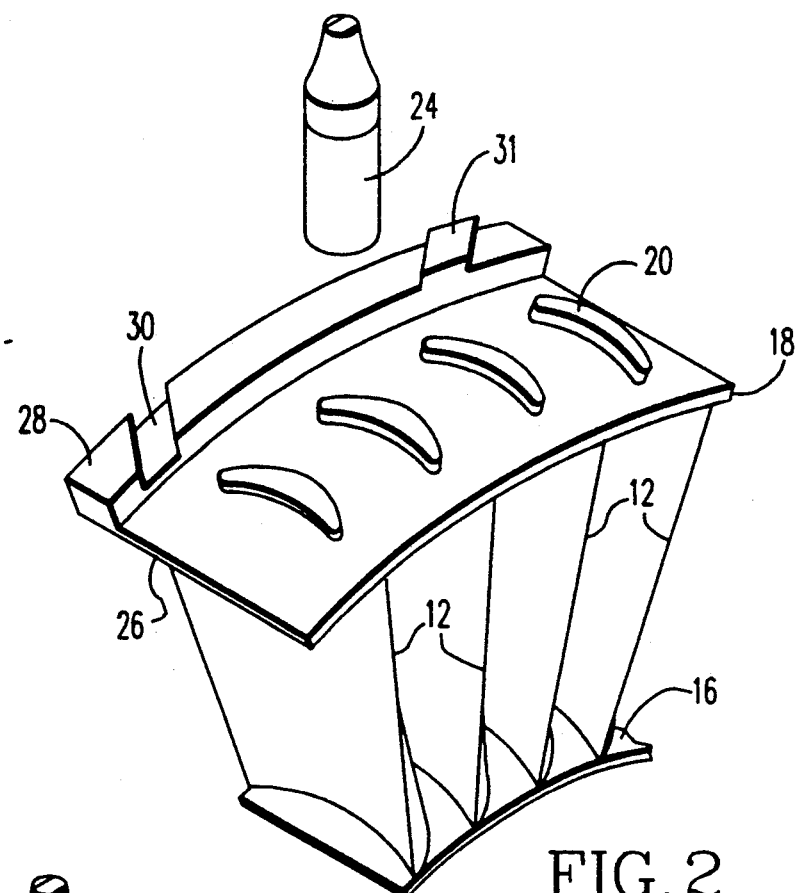
FIG. 2 illustrates one of the shroud segments shown in FIG. 1 having targets formed in the shroud segment in accordance with the teachings of the present invention.
Figure 5:
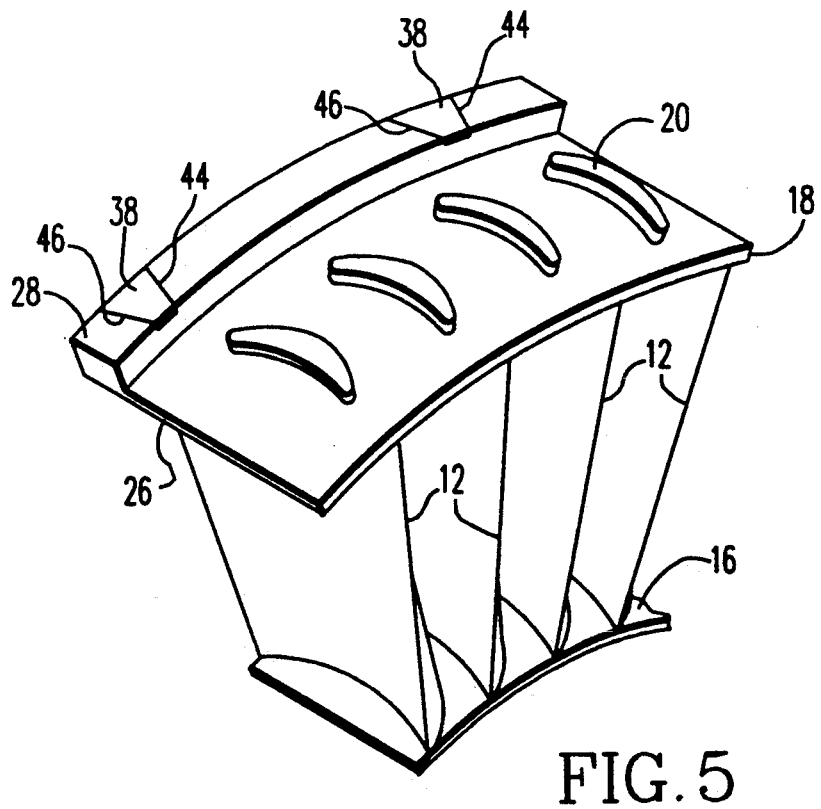

As an alternative to the notches 30, 32, 33 shown in FIGS. 2 and 3, a thin layer of a conductive material may be used as the target as shown at 34 in FIG. 4. The electrically conductive material 34 may be a metal foil bonded to the raised portion 28 through the use of a resin epoxy capable of withstanding the high temperatures experienced within the turbine. Alternatively, the conductive metal foil 34 may be braised or soldered to the raised portion 28. A still further embodiment is the plating or depositing of the conductive material 34. Finally, a shallow slot 36 may be milled in the raised portion 28 so that the conductive target 35 may be set flush with the surface of the raised portion 28. Of course, whichever type of target is chosen, that type of target will be used throughout the shroud as shown in FIG. 5. The use of different targets 30 and 31 as shown in FIG. 2, and targets 34 and 35 as shown in FIG. 4 are merely for purposes of illustration.

FIG. 5 illustrates another shape which the targets may take. In FIG. 5, two identical targets 38 are illustrated which may be foils, shims, or deposited conductive material. The targets 38 have a leading edge 44 extending at an angle with respect to the rotor 14 (such that the leading edge's 44 time of arrival at the sensor 24 is effected by axial vibration) and a trailing edge 46 extending in an axial direction (such that the trailing edge's 46 time of arrival at the sensor 24 is unaffected by axial vibration). By providing appropriate electronics, the difference in arrival times of the leading 44 and trailing 46 edges can be used to more accurately discriminate axial vibration.

Targets comprising a milled axial notch (not shown) with a circumferential width and axial length of 0.5 inches (12.7 mm) and a depth of 0.050–0.100 inches (1.27 mm–2.54 mm) and thin conductive foils 34 of 0.5 inch (12.7 mm) squares have been tested on stationery set ups and on a rotating rig. The sensor 24 used was a Bentley-Nevada model 817230-00-20-50-02 probe (14 mm diameter) used in conjunction with a Bentley-Nevada model 81725-01 proximeter. The proximeter provides the conditioning circuitry for the probe. Should the width of the raised portion 28 be less than the diameter of the probe, the targets can be positioned on the first portion 26 on the shroud segment 18. Results from the test may be summarized as follows:

The eddy current sensor pulse voltages Vout produced from the axial notch are as follows:

0.050 in (1.27 mm) deep 3.0 volts (adequate)
0.100 in (2.54 mm) deep 4.0 volts (better)

The results with foils and deposited conductive materials 32 of the indicated thickness are as follows:

0.010 in (0.254 mm) NiCr 80 0.2 volts
0.010 in (0.254 mm) brass 4.0 volts
0.030 in (0.762 mm) copper 4.0 volts
0.003 in (0.076 mm) aluminum 4.0 volts
0.0012 in (0.030 mm) aluminum 2.4 volts The pulses resulting from the foils and deposited conductive materials looked as good as those produced with 0.100 inch (2.54 mm) deep notches. It was discovered, however, that self generating permanent magnetic sensors (e.g. Airpax sensors) which are used for most open-ended steel blades do not produce an adequate signal with the foil or deposited conductive material targets.

Figure 6:
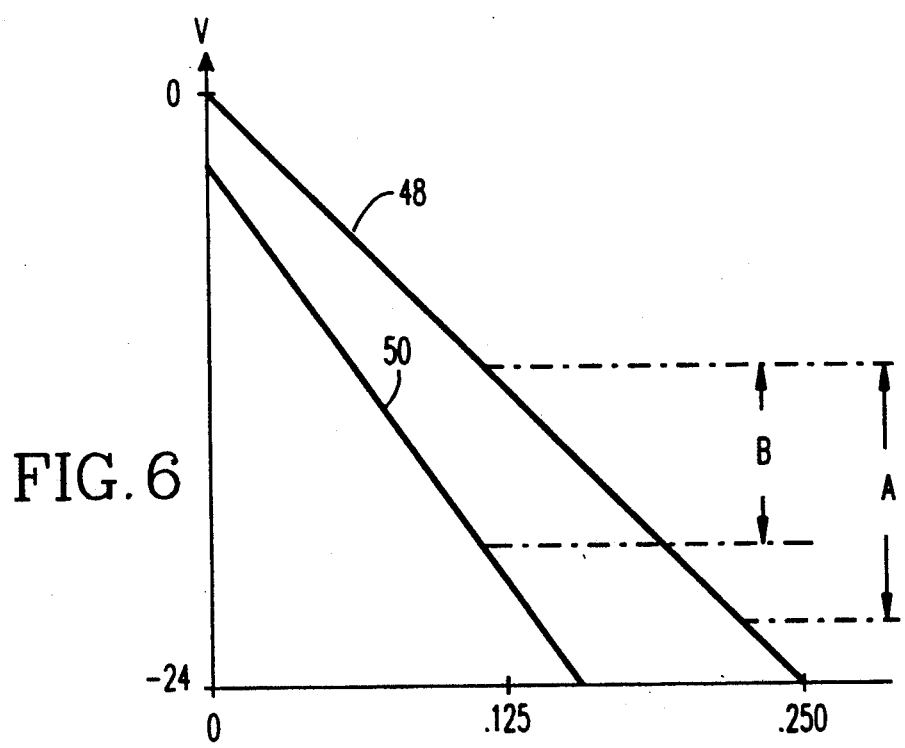
FIG. 6 is a graph illustrating the sensor output voltage as a function of the distance between the sensor and the shroud for a typical shroud material and one type of target material.

In FIG. 6, the sensor 24 output voltage Vout is illustrated as a function of the clearance between the sensor 24 and shroud segment 18. Line 48 represents the output voltage Vout as a function of clearance for a typical shroud material (i.e. steel), whereas line 50 represents the output voltage versus clearance for a shroud covered with a 0.003 inch (0.076 mm) conductive layer of aluminum. The difference between "A" and "B" in FIG. 6 demonstrates that a 0.003 inch (0.076 mm) thick conductive target produces a step change (B) in the output signal Vout of the same order of magnitude as the step change (A) in the output signal Vout produced by a notch in the shroud even though the depth of the notch is almost two orders of magnitude greater than the thickness of the conductive layer.

Although the present invention has been shown using only one sensor 24 for the turbine blade row 10, as previously noted more than one sensor 24 may be used depending on the desired application. While the present invention has been described in connection with exemplary embodiments thereof, it will be understood that many modifications and variations will be readily apparent to those of ordinary skill in the art. This disclosure and the following claims are intended to cover all such modifications and variations.

What is claimed is:

1. A system for monitoring the vibration of a plurality of turbine blades carried by a rotor and configured in a row, said blades being surrounded at their periphery by a plurality of shroud segments, said system comprising:

stationary sensor means for inducing eddy currents in each shroud segment as each shroud segment passes said sensor means and for sensing variations in said induced eddy currents;

target means located on each shroud segment for causing variations in said induced eddy currents, said target means including a conductive metal foil located in a recess in a shroud segment, said sensor means being responsive to said variations in said induced eddy currents to produce an output signal containing information corresponding to the time of arrival of said target means at said sensor means;

means for producing a once per rotor revolution pulse; and means responsive to said output signal and said once per rotor revolution pulse for extracting blade vibration information therefrom.

2. The system of claim 1, wherein each of said metal foils has at least one edge oriented at an angle with respect to the axis of the rotor.

3. A method of monitoring the vibration of a plurality of turbine blades carried by a rotor and configured in a row, said blades being surrounded at their periphery by a plurality of shroud segments, said method comprising the steps of:

inducing eddy current with a sensor in each shroud segment as each shroud segment passes the sensor;

causing variations in the induced eddy currents with a conductive metal foil located in a recess in each shroud segment;

producing an output signal responsive to said variations in said induced eddy currents which contains information corresponding to the time of arrival of the foil at the sensor;

producing a pulse once per rotor revolution; and extracting blade vibration information from the output signal and the once per revolution pulse.

* * * * *